United States Patent
Mason et al.

(10) Patent No.: US 8,413,418 B2
(45) Date of Patent: Apr. 9, 2013

(54) GAS TURBINE ENGINE

(75) Inventors: Samuel A. Mason, Derby (GB); Mark D. Taylor, Derby (GB); Torbjorn O. Lindquist, Skattkarr (SE); Robert J. Miller, Cambridge (GB); Jonathan J. H. Heffer, Bristol (GB)

(73) Assignee: Rolls-Royce PLC, London (GB)

( * ) Notice: Subject to any disclaimer, the term of this patent is extended or adjusted under 35 U.S.C. 154(b) by 817 days.

(21) Appl. No.: 12/591,260

(22) Filed: Nov. 13, 2009

(65) Prior Publication Data

US 2010/0150705 A1    Jun. 17, 2010

(30) Foreign Application Priority Data

Dec. 12, 2008 (GB) .................................. 0822676.3

(51) Int. Cl.
*F02C 5/00* (2006.01)
*F02G 1/00* (2006.01)
*F02G 3/00* (2006.01)

(52) U.S. Cl. .......................... 60/39.76; 60/39.38; 60/247

(58) Field of Classification Search .................... 60/247, 60/249, 39.38, 39.39, 39.76, 39.78; 415/198.1, 415/211.2
See application file for complete search history.

(56) References Cited

U.S. PATENT DOCUMENTS

| | | | |
|---|---|---|---|
| 3,877,219 A * | 4/1975 | Hagen | 60/39.38 |
| 5,174,715 A * | 12/1992 | Martin | 415/209.4 |
| 7,000,402 B2 * | 2/2006 | Benians | 60/776 |
| 7,195,456 B2 * | 3/2007 | Aggarwala et al. | 415/208.2 |
| 7,527,473 B2 * | 5/2009 | Humanchuk et al. | 415/191 |
| 7,625,181 B2 * | 12/2009 | Matsuda et al. | 416/193 A |
| 2004/0083713 A1 | 5/2004 | Clark | |
| 2008/0155959 A1 | 7/2008 | Rasheed et al. | |

FOREIGN PATENT DOCUMENTS

WO     WO 03/023203 A3    3/2003

OTHER PUBLICATIONS

British Search Report for British Application No. 0822676.3, Apr. 7, 2009, 1 p.

* cited by examiner

*Primary Examiner* — William H Rodriguez
(74) *Attorney, Agent, or Firm* — Oliff & Berridge, PLC

(57) ABSTRACT

A gas turbine engine (10) having a pressure-rise combustor (30) and the pressure-rise combustor (30) is positioned upstream of a stage of turbine nozzle guide vanes (32). The vanes (33) of the stage of turbine nozzle guide vanes (32) forms an ejector and each of the vanes (33) has an upstream portion (34) and a downstream portion (36). The upstream portions (34) of the vanes (33) have leading edges (38) and the upstream portions (34) are arranged substantially straight and parallel to define constant area mixing passages (40) for a flow of gases there-through. The downstream portions (36) of the vanes (33) are arranged at an angle to the upstream portions (34) of the vanes (33) to turn the flow of gases therethrough.

11 Claims, 1 Drawing Sheet

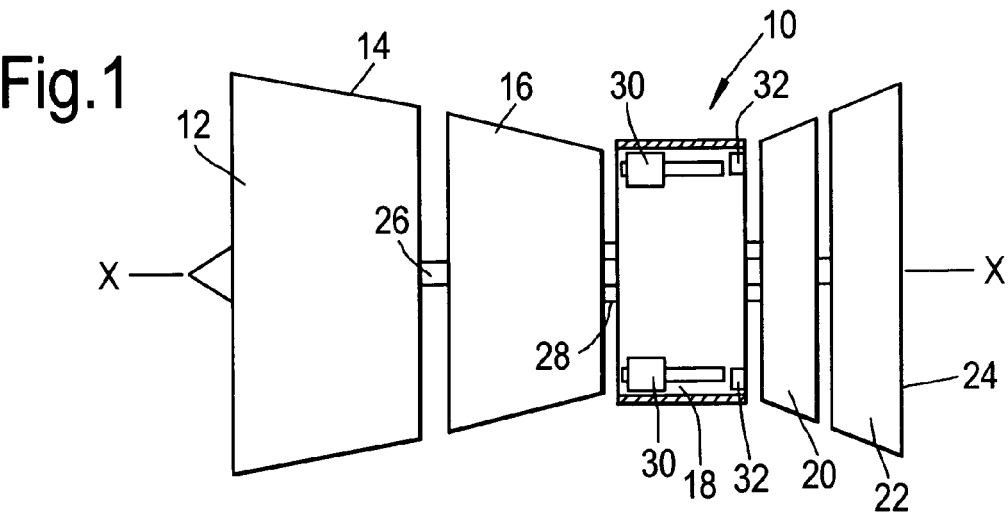
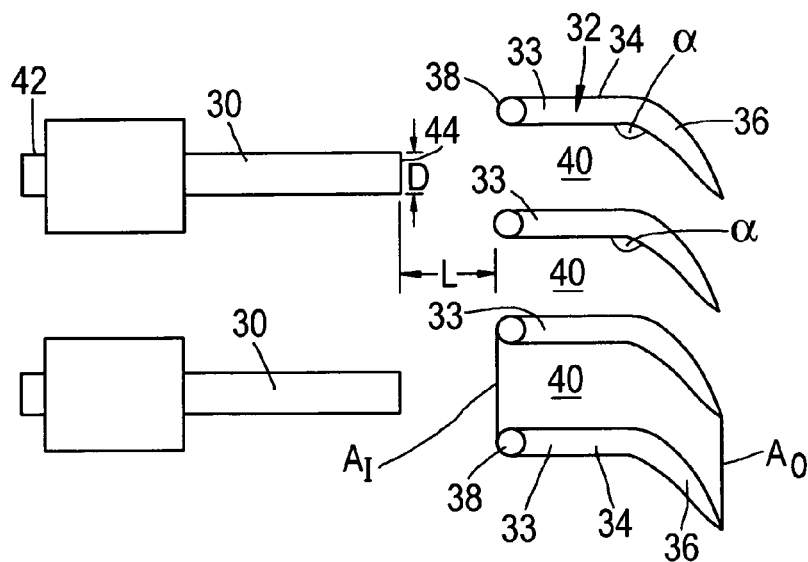
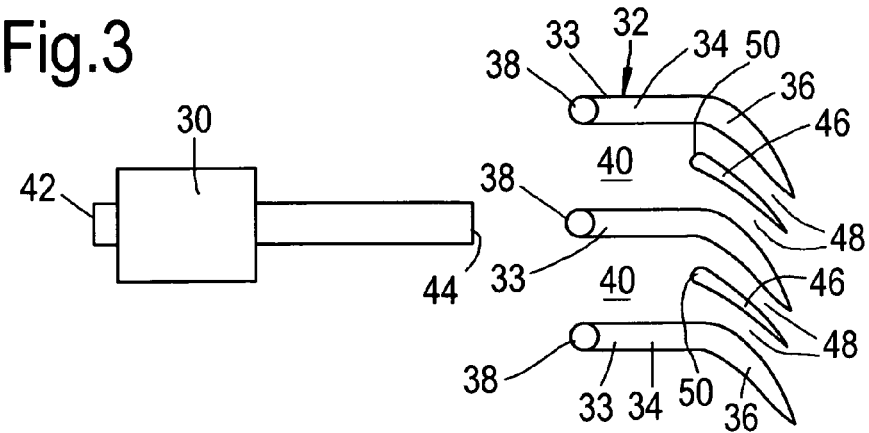

GAS TURBINE ENGINE

The present invention relates to a gas turbine engine and in particular to a gas turbine engine having a pressure-rise combustor. A pressure-rise combustor is also known as a pressure-gain combustor.

A pressure-rise combustor produces an unsteady flow of exhaust gases. A pressure-rise combustor produces a flow of exhaust gases which has a large amplitude of unsteadiness. In order to extract mechanical power from the exhaust gases leaving the pressure-rise combustor it is necessary to rectify the flow.

It is known to rectify the flow of exhaust gases from a pressure-rise combustor by providing an ejector downstream of the pressure-rise combustor and upstream of a stage of turbine nozzle guide vanes. The ejector positioned downstream of the pressure-rise combustor produces a pressure field, which causes ambient air/gas to be drawn into the ejector with the exhaust gases from pressure-rise combustor. The ambient air/gas and exhaust gases from the pressure-rise combustor mix together in the ejector and leave the ejector with an approximately steady flow.

A problem with this arrangement is that the mixing process occurring in the ejector is an irreversible process, which has a negative impact on the overall efficiency of the pressure-rise combustor. In our tests it has been estimated that approximately 40% of the mechanical energy content of the unsteady exhaust gas flow from the pressure-rise combustor is wasted. In addition the use of an ejector in flow series between the pressure-rise combustor and the stage of turbine nozzle guide vanes considerably increases the axial length of the arrangement. A gas turbine engine with such an arrangement would require longer and heavier shafts than currently used in gas turbine engines.

Accordingly the present invention seeks to provide a novel gas turbine engine having a pressure-rise combustor, which reduces, preferably overcomes, the above mentioned problem.

Accordingly the present invention provides a gas turbine engine having at least one pressure-rise combustor, the at least one pressure-rise combustor being positioned upstream of a stage of turbine nozzle guide vanes, the vanes of the stage of turbine nozzle guide vanes forming an ejector, wherein each of the vanes having an upstream portion and a downstream portion, the upstream portions of the vanes having leading edges and the upstream portions being arranged substantially straight and parallel to define constant area mixing passages between adjacent vanes for a flow of gases there-through, the downstream portions of the vanes being arranged at an angle to the upstream portions of the vanes to turn the flow of gases there-through.

Preferably the at least one pressure-rise combustor is a pulsejet combustor, a valve-less pulsejet combustor or a pulse detonation combustor.

Preferably there is a compressor upstream of the at least one pressure-rise combustor and a turbine downstream of the stage of turbine nozzle guide vanes.

Preferably there are a plurality of pressure-rise combustors positioned upstream of the stage of turbine nozzle guide vanes.

Preferably the pressure-rise combustors are arranged circumferentially around an axis of the gas turbine engine.

Preferably the ratio of the distance between the outlet of the at least one pressure-rise combustor and the leading edges of the upstream portions of the vanes to the diameter of the outlet of the at least one pressure-rise combustor is 1 to 1 or less than 1 to 1.

Preferably the turbine nozzle guide vanes have a contraction ratio, the contraction ratio is the ratio of flow area into the turbine nozzle guide vanes to the flow area out of the turbine nozzle guide vanes and the contraction ratio is in the range of 8 to 1 to 30 to 1.

There may be one or more splitter vanes positioned between adjacent vanes of the stage of turbine nozzle guide vanes, the one or more splitter vanes are positioned between the downstream portions of adjacent vanes.

The present invention will be more fully described by way of example with reference to the accompanying drawings in which:—

FIG. 1 shows a gas turbine engine having a pressure-rise combustor and nozzle guide vane arrangement according to the present invention.

FIG. 2 is an enlarged schematic of a pressure-rise combustor and nozzle guide vane arrangement according to the present invention.

FIG. 3 is an enlarged schematic of a further pressure-rise combustor and nozzle guide vane arrangement according to the present invention.

A gas turbine engine 10, as shown in FIG. 1, comprises in axial flow series an inlet 12, a low pressure compressor 14, a high pressure compressor 16, a combustion section 18, a high pressure turbine 20, a low pressure turbine 22 and an exhaust 24. The low pressure turbine 22 is arranged to drive the low pressure compressor 14 via a shaft 26 and the high pressure turbine 20 is arranged to drive the high pressure compressor 16 via a shaft 28. The combustion section 18 comprises at least one pressure-rise combustor 30 and the at least one pressure-rise combustor 30 is positioned upstream of a stage of turbine nozzle guide vanes 32. The gas turbine engine 10 is generally conventional and it operates in a conventional manner.

The vanes 33 of the stage of turbine nozzle guide vanes 32 form an ejector, shown more clearly in FIG. 2, wherein each of the vanes 33 of the stage of turbine nozzle guide vanes 32 has an upstream portion 34 and a downstream portion 36. The upstream portions 34 of the vanes 33 have leading edges 38 and the upstream portions 34 of the vanes 33 are arranged to extend substantially in straight lines. The upstream portions 34 of the vanes 33 are arranged substantially parallel to each other to define constant area mixing passages 40 for a flow of gases there-through. The downstream portions 36 of the vanes 33 are arranged at an angle $\alpha$ to the upstream portions 34 of the vanes 33 to turn the flow of gases there-through. Thus the low pressure compressor 14 and high pressure compressor 16 are upstream of the at least one pressure-rise combustor 30 and the high pressure turbine 20 and low pressure turbine 22 are downstream of the stage of turbine nozzle guide vanes 32.

The at least one pressure-rise combustor 30 may be a pulsejet combustor, a valve-less pulsejet combustor or a pulse detonation combustor.

Preferably there are a plurality of pressure-rise combustors 30 positioned upstream of the stage of turbine nozzle guide vanes 32. The pressure-rise combustors 30 are arranged circumferentially around an axis X-X of rotation of the gas turbine engine 10.

The pressure-rise combustors 30 have inlets 42 at their upstream end to receive air from the high pressure compressor 16 and outlets 44 at their downstream ends to discharge exhaust gases towards the turbine nozzle guide vanes 32 and high pressure turbine 20. The outlets 44 of the pressure-rise combustors 30 have a diameter D and are spaced from the leading edges 38 of the turbine nozzle guide vanes 32 by a distance L.

Preferably the ratio of the distance L between the outlets 44 of the at least one pressure-rise combustor 30 and the leading edges 38 of the upstream portions 34 of the vanes 33 of the turbine nozzle guide vanes 32 to the diameter D of the outlet 44 of the at least one pressure-rise combustor 30 is 1 to 1 or less than 1 to 1. The turbine nozzle guide vanes 32 have a contraction ratio in the range of 8 to 1 to 30 to 1. The contraction ratio of the turbine nozzle guide vanes 32 is the ratio of flow area $A_I$ into the turbine nozzle guide vanes 32 to the flow area $A_O$ out of the turbine nozzle guide vanes 32.

The distance L from the outlet 44 of the pressure-rise combustor 30 to the leading edge 38 of the vanes 32 is maintained small to retain maximum mechanical energy in the flow of exhaust gases from the pressure-rise combustors 30.

In another embodiment of the present invention it may be possible to reduce the number of pressure-rise combustors 30, but to increase the size of the pressure-rise combustors 30 and this increases the efficiency, or pressure-rise/pressure-gain, generated by the pressure-rise combustor 30. This would require the exhaust gases from each pressure-rise combustor 30 to flow into a plurality of mixing passages 40 between the upstream portions 34 of adjacent vanes 32 and one or more splitter vanes 46 would be required in the mixing passages 40 between the downstream portions 36 of adjacent vanes 32. Thus, in this arrangement the upstream portions 34 of the vanes 33 again define constant area mixing passages 40 and each constant area mixing passage 40 supplies a flow of gases into passages 48 between the downstream portions 36 of the vanes 33 and the splitter vanes 46. The splitter vanes 46 are located equi-distant between the downstream portions 36 of the vanes 33 and the splitter vanes 46 have substantially the same profile as the downstream portions 36 of the vanes 33. The leading edges 50 of the splitter vanes 46 may extend in an upstream direction slightly into the mixing passage 40 between the upstream portions 34 of the vanes 33. If there is more than one splitter vane 46 between adjacent vanes 33, then some of the passages 48 are defined between two splitter vanes 46. In this case the distances between adjacent splitter vanes 46 and the distances between splitter vanes 46 and the downstream portions 36 of the vanes 33 are equal.

Furthermore, the ratio of the number of splitter vanes to pressure-rise combustors 30 may be increased by providing a plurality of splitter vanes 46 between the downstream portions 36 of adjacent vanes 32. The leading edge 38 of the upstream portions 34 of the vanes 32 may have a part-circular cross-section or a square cross-section.

In the embodiments mentioned above the cross-sectional area of the outlet 44 of the pressure-rise combustor 30 is less that the cross-sectional area of the inlet to the mixing ducts 40 and preferably the ratio of the cross-sectional area of the inlet to the mixing passage to the cross-sectional area of the outlet of the pressure-rise combustor is 5.5 to 1.

Adjacent pressure-rise combustors may be arranged to fire in phase or out of phase.

The present invention provides an axially compact arrangement for a pressure-rise, or pressure-gain, combustor compared with the previous arrangements with an ejector in flow series between the pressure-rise combustor and a stage of turbine nozzle guide vanes. The present invention enables the axial length of a gas turbine engine having a pressure-rise combustor to be reduced, reducing the axial length of shafts and hence the weight and cost of the gas turbine engine. In addition the present invention reduces the amount of material exposed to high temperature exhaust gases and thus reducing the cooling requirements. Also the exhaust gases from the pressure-rise combustor are mixed with the ambient gas around the pressure-rise combustor in an accelerating region within the passages between the vanes of the stage of turbine nozzle guide vanes and therefore entropy production, or irreversibilities, are minimised, thereby increasing the efficiency of the pressure-rise combustor. The present invention produces a steady flow of gases at the outlet of the turbine nozzle guide vanes from the unsteady flow of exhaust gases from the outlets of the pressure-rise combustors.

The gas turbine engine may be a turbofan gas turbine engine, a turbopropeller gas turbine engine, a turboshaft gas turbine engine or a turbojet gas turbine engine.

The invention claimed is:

1. A gas turbine engine having at least one pressure-rise combustor and a stage of turbine nozzle guide vanes, the at least one pressure-rise combustor being positioned upstream of the stage of turbine nozzle guide vanes, the vanes of the stage of turbine nozzle guide vanes forming an ejector, wherein each of the vanes having an upstream portion and a downstream portion, the upstream portions of the vanes having leading edges and the upstream portions of the vanes being arranged substantially straight and parallel to define constant area mixing passages between adjacent vanes for a flow of gases there-through, the downstream portions of the vanes being arranged at an angle to the upstream portions of the vanes to turn the flow of gases there-through.

2. A gas turbine engine as claimed in claim 1 wherein the at least one pressure-rise combustor is selected from the group comprising a pulsejet combustor, a valve-less pulsejet combustor and a pulse detonation combustor.

3. A gas turbine engine as claimed in claim 1 wherein there is a compressor upstream of the at least one pressure-rise combustor and a turbine downstream of the stage of turbine nozzle guide vanes.

4. A gas turbine engine as claimed in claim 1 wherein there are a plurality of pressure-rise combustors positioned upstream of the stage of turbine nozzle guide vanes.

5. A gas turbine engine as claimed in claim 4 wherein the gas turbine engine has an axis, the pressure-rise combustors are arranged circumferentially around an axis of the gas turbine engine.

6. A gas turbine engine as claimed in claim 1 wherein the ratio of a distance between the outlet of the at least one pressure-rise combustor and the leading edges of the upstream portions of the vanes to the diameter of the outlet of the at least one pressure-rise combustor is equal to, or less than, 1 to 1.

7. A gas turbine engine as claimed in claim 1 wherein the turbine nozzle guide vanes have a contraction ratio, the contraction ratio is the ratio of flow area into the turbine nozzle guide vanes to the flow area out of the turbine nozzle guide vanes and the contraction ratio is in the range of 8 to 1 to 30 to 1.

8. A gas turbine engine as claimed in claim 1 wherein at least one splitter vane is positioned between adjacent vanes of the stage of turbine nozzle guide vanes, the at least one splitter vane is positioned between the downstream portions of adjacent vanes.

9. A gas turbine engine as claimed in claim 1 wherein the ratio of the cross-sectional area of the inlet to a mixing passage to the cross-sectional area of the outlet of a pressure-rise combustor is 5.5 to 1.

10. A gas turbine engine as claimed in claim 4 wherein the pressure-rise combustors are arranged to fire in phase.

11. A gas turbine engine as claimed in claim 1 wherein the gas turbine engine is selected from the group comprising a turbopropeller gas turbine engine, a turbofan gas turbine engine, a turbojet gas turbine engine and a turboshaft gas turbine engine.

* * * * *